J. F. HURLEY.
VEHICLE WINDOW.
APPLICATION FILED OCT. 21, 1920.
1,432,396.                                  Patented Oct. 17, 1922.
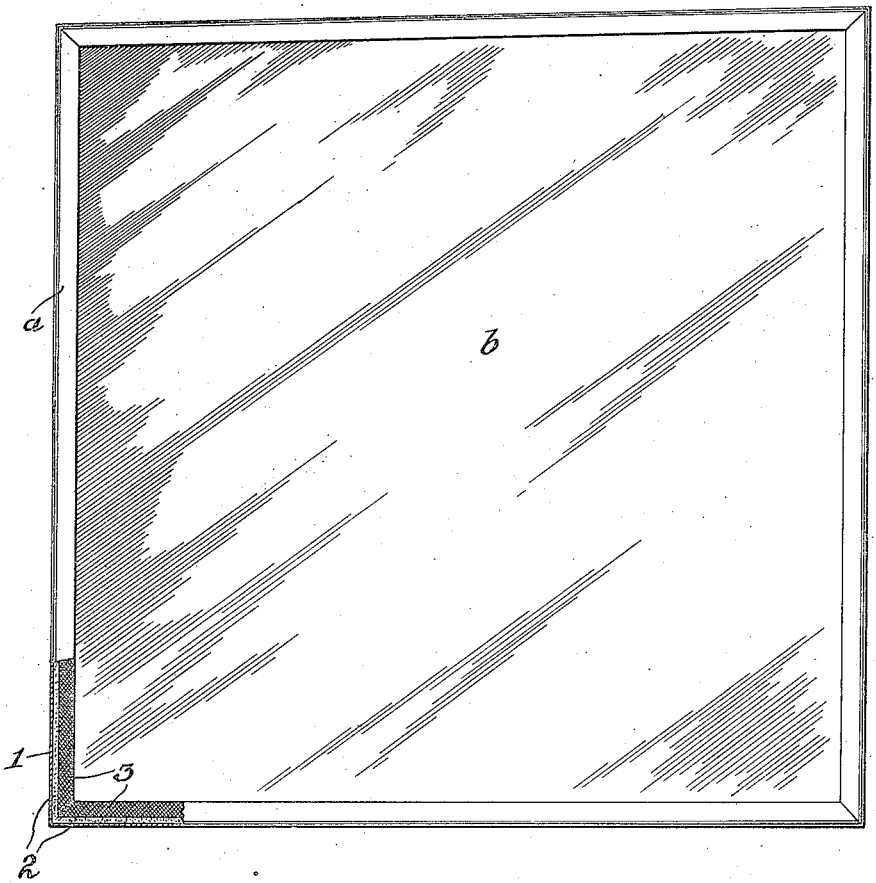
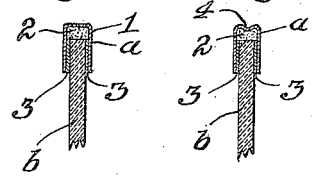
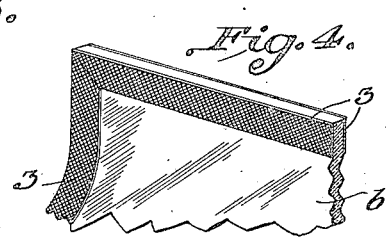
Inventor
John F. Hurley Patented Oct. 17, 1922.

1,432,396

UNITED STATES PATENT OFFICE.

JOHN F. HURLEY, OF DENVER, COLORADO.

VEHICLE WINDOW.

Application filed October 21, 1920. Serial No. 418,526.

*To all whom it may concern:*

Be it known that I, JOHN F. HURLEY, a citizen of the United States, residing at Denver, in the county of Denver and State of Colorado, have invented certain new and useful Improvements in Vehicle Windows; and I do hereby declare the following to be a full, clear, and exact description of the invention, such as will enable others, skilled in the art to which it appertains, to make and use the same.

This invention relates to windows, particularly to sashes or edge frames inclosing or protecting an edge of a panel of glass adapted to be slidably or otherwise movably mounted in the body of a motor vehicle.

It has been customary to use relatively heavy plate glass for the sliding windows of automobile bodies and to mount said plates slidably in the body without any sash or framing for the glass. Owing to the vibrations of a vehicle in motion it is not feasible to use glass of the usual thickness of window glass in this manner because it is not heavy enough to withstand the shocks and jars to which it is subjected. This invention contemplates the use of window glass, set in a sash, in contact with shock absorbing materials, in place of heavy, sashless windows of expensive plate glass, and an object is to enable relatively thin glass to be used for automobile windows without danger of breakage.

In the drawings wherein similar reference characters designate similar parts throughout the several views:

Figure 1 is a side elevation of a sash and glass adapted for a vehicle body;

Figure 2 is a cross section through one form of sash;

Figure 3 is a cross section through another form of sash;

Figure 4 is a fragmentary perspective of a glass plate having shock absorbing tape attached.

In said drawings, $a$ represents a sash or other edge protecting means as a whole, and $b$ a pane of glass set in said sash, the window being of a configuration typical of an automobile window, adapted to slide vertically in a door or other part of a body.

As shown in Figure 1, the sides and ends, or stiles and cross bars, of the sash are formed of channels 1 preferably of sheet metal of ductile and flexible or pliable nature.

Along the bottom of the channel is a thick layer 2 of shock absorbing material, such as heavy felt. The said layer of felt 2 is interposed between the edge of the pane of glass and the bottom of the channel members 1.

Interposed between the marginal edges of glass $b$ and each side of the channel 1 are layers of heavy adhesive tape 3, which may be the heavy adhesive insulating tape used in electric wiring. This tape is yielding and adheres both to the margin of the glass and to the metal of the sash or frame.

The frame or sash may be built around the edges of the glass or the sash may be made with one of its cross bars removable, as desired.

In practice the edges of the pane should rest neatly against the felt or like cushion strip 2. The tape 3 should fill the spaces between the margin of the glass and the sides of the channels. The adhesive tape may be applied to the margin of the pane before inserting it in the sash. After the pane is set in the sash the sides of the sash may be squeezed against the tape so as to cause firm adhesion.

In the form of sash shown in Figure 3 the channel $1^a$ is constructed with a groove or pleat 4 so that the said channel may be reduced in width by lateral pressure in order to compensate for variations in thickness of glass used, or to enable the sides to be pressed against the tape 3 while maintaining the sides parallel.

By my invention window, or other relatively thin and inexpensive glass, may be used in place of heavy expensive plate glass for the windows of motor vehicles. The glass is effectively cushioned and cannot break under the jars or shocks of ordinary travel. The windows may be produced cheaply, and satisfactorily serve their purposes.

Having described my invention in such manner as to enable those skilled in the art to make and use the same, what I claim is:

1. In a device of the class described the combination of a pane of glass, with an edge protecting means comprising a channel member embracing the edge of the pane and adhesive strips of yieldable material interposed between the pane and the sides of the channel member and adhering both to the pane and the sides of the channel.

2. In a device of the class described the combination of a pane of glass with an edge protecting means comprising a channel member embracing the edge of the pane, a cushion layer between the edge of the pane and the bottom of the channel member and adhesive strips of yieldable material interposed between the pane and the sides of the channel member and adhering both to the pane and the sides of said channel.

3. In a device of the class described the combination of a pane of glass with an edge protecting means comprising a channel member of pliable material and adhesive strips of yieldable material interposed between the pane and the sides of the channel member and adhering both to the pane and the sides of said channel.

4. In a device of the class described the combination of a pane of glass with an edge protecting means comprising a channel member of pliable sheet metal having a longitudinal pleat in its back and parallel sides embracing the edge of the pane.

In testimony whereof I affix my signature.

JOHN F. HURLEY.